(12) United States Patent
Handel et al.

(10) Patent No.: US 9,289,848 B2
(45) Date of Patent: Mar. 22, 2016

(54) METHOD OF ATTACHING A WIRE CABLE TERMINAL TO A MULTI-STRAND WIRE CABLE

(71) Applicant: DELPHI TECHNOLOGIES, INC., Troy, MI (US)

(72) Inventors: Jeffrey M. Handel, Warren, OH (US); John Thomas Kightlinger, Canfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 230 days.

(21) Appl. No.: 14/017,384

(22) Filed: Sep. 4, 2013

(65) Prior Publication Data
US 2015/0060135 A1    Mar. 5, 2015

(51) Int. Cl.
| H01R 43/04 | (2006.01) |
| --- | --- |
| B23K 20/10 | (2006.01) |
| B23K 20/233 | (2006.01) |
| H01R 43/02 | (2006.01) |
| H01R 43/28 | (2006.01) |
| H01R 43/048 | (2006.01) |
| H01R 4/18 | (2006.01) |

(52) U.S. Cl.
CPC ............. *B23K 20/10* (2013.01); *B23K 20/2336* (2013.01); *H01R 43/0207* (2013.01); *H01R 43/28* (2013.01); *B23K 2201/32* (2013.01); *B23K 2201/38* (2013.01); *B23K 2203/10* (2013.01); *H01R 4/185* (2013.01); *H01R 43/048* (2013.01); *Y10T 29/49185* (2015.01)

(58) Field of Classification Search
CPC .. H01R 43/0207; H01R 43/048; H01R 4/185; Y10T 29/49174; Y10T 29/49181; Y10T 29/49192; Y10T 29/5193; Y10T 29/53209; Y10T 29/53226; Y10T 29/53235; Y10T 29/5327; Y10T 29/49826
USPC .................... 29/861, 855, 857, 860, 863, 867; 228/1.1, 103, 110.1, 111, 111.5
See application file for complete search history.

(56) References Cited

U.S. PATENT DOCUMENTS

| 4,730,764 A | 3/1988 | Hawkins et al. |
| --- | --- | --- |
| 4,799,614 A | 1/1989 | Welter et al. |
| 4,867,370 A | 9/1989 | Welter et al. |
| 8,181,343 B2 | 5/2012 | Martauz et al. |

FOREIGN PATENT DOCUMENTS

JP        2007250393      *   9/2007

* cited by examiner

*Primary Examiner* — Thiem Phan
(74) *Attorney, Agent, or Firm* — Robert J. Myers (57) ABSTRACT

A wire cable configured to be attached to a wire cable terminal. An uninsulated end of the wire cable is formed into a nugget having a shape that generally defines a rectangular cuboid or rectangular prism. The nugget includes one face that defines a longitudinal concavity, indentation, or channel, which is oriented generally parallel to the longitudinal axis of the wire cable. The nugget may be formed by ultrasonically welding the wire strands together. The concavity reduces the occurrence of fracturing the nugget when it is attached to the terminal by wire crimping wings. The wire cable may be formed of aluminum-based material. An apparatus for forming an end of a wire cable into a nugget shape having a longitudinal concavity and a method of attaching a wire cable having an end formed into a nugget shape having a longitudinal concavity to a terminal is also presented.

12 Claims, 6 Drawing Sheets

METHOD OF ATTACHING A WIRE CABLE TERMINAL TO A MULTI-STRAND WIRE CABLE

TECHNICAL FIELD OF THE INVENTION

The invention generally relates to a multi-strand wire cable attached to a wire cable terminal, and more particularly relates to a method of attaching a wire cable terminal to a multi-strand wire cable with an uninsulated end generally in the shape of a rectangular cuboid having one face that defines a longitudinal concavity, the wire cable formed by this method, and an apparatus for forming this wire cable.

BACKGROUND OF THE INVENTION

Aluminum wire cables are increasingly being incorporated in automotive wiring harnesses. There are several factors driving this trend. First, the market price of copper, traditionally used for automotive wiring, is significantly higher and more volatile than that of aluminum. Second, aluminum wiring is approximately half the weight of the equivalent copper wiring. The push for more fuel efficient vehicles is requiring weight to be taken out of the vehicle and aluminum-based wire cables provide a good opportunity to reduce weight by substituting aluminum cable for copper cable.

Aluminum does have some disadvantages for vehicle wiring applications. Aluminum cable typically has multiple strands in the wire cable to increase flexibility of the cable. Aluminum forms an oxide layer that has a lower electrical conductivity than aluminum and is very hard. Because these aluminum oxides form almost instantaneously on the surface of the aluminum wires when exposed to air, individual wire strands in the cable do not electrically connect well to each other. Additionally, aluminum wire strands in a crimped connection can also deform over time due to stress relaxation and creep. As the aluminum wire in a termination changes shape, electrical resistance can increase causing increased connection resistance, heat build-up, and connector failure. Because of these challenges, conventional crimped connections to aluminum cable constructions with a large number of strands do not provide a robust low resistance connection that will withstand environmental exposure over time. Alternate connection technologies are required to help interconnect each strand in the cable core so they act as a single conductor. It may also be desirable to use existing wire cable terminals, hereafter referred to as terminals, designed for copper cable connection systems to avoid the expense of designing new terminals made especially for aluminum cable.

One method of interconnecting the wire stands is ultrasonically welding the wire stands together. In some cases, the wire stands are directly ultrasonically welded to the terminal. This process, however, requires a terminal with a wire connecting end that is designed specifically for ultrasonic connection. These ultrasonic terminals require different tooling than the crimp connectors typically used for copper wire cables. Alternatively, the wire strands may be ultrasonically welded together forming a generally rectangular cuboid "nugget". Examples of methods and apparatus that may be used to ultrasonically weld the ends of wire cables to form a rectangular cuboid nugget are found in U.S. Pat. No. 4,730,764 issued to Hawkins et al. on Mar. 15, 1988 and U.S. Pat. No. 4,867,370 issued to Welter et al. on Sep. 19, 1989. After welding, the nugget may be trimmed to a desired length and dipped in a liquid sealant prior to crimping the terminal. An example of such a method of applying a sealant to a crimped wire connection may be found in U.S. Pat. No. 8,181,343 granted to Martauz, et al. on May 22, 2012. The coated nugget is then attached to the terminal by crimping the nugget to the terminal. The process of crimping the terminal to the rectangular weld nugget creates stresses in the nugget which may cause the nugget to fracture. In some cases, this nugget fracture results in voids in the sealant coating. Therefore, it is desirable to form a nugget that interconnects the wire strand that is resistant to fracture when crimped to a terminal.

Figures 1, 2:
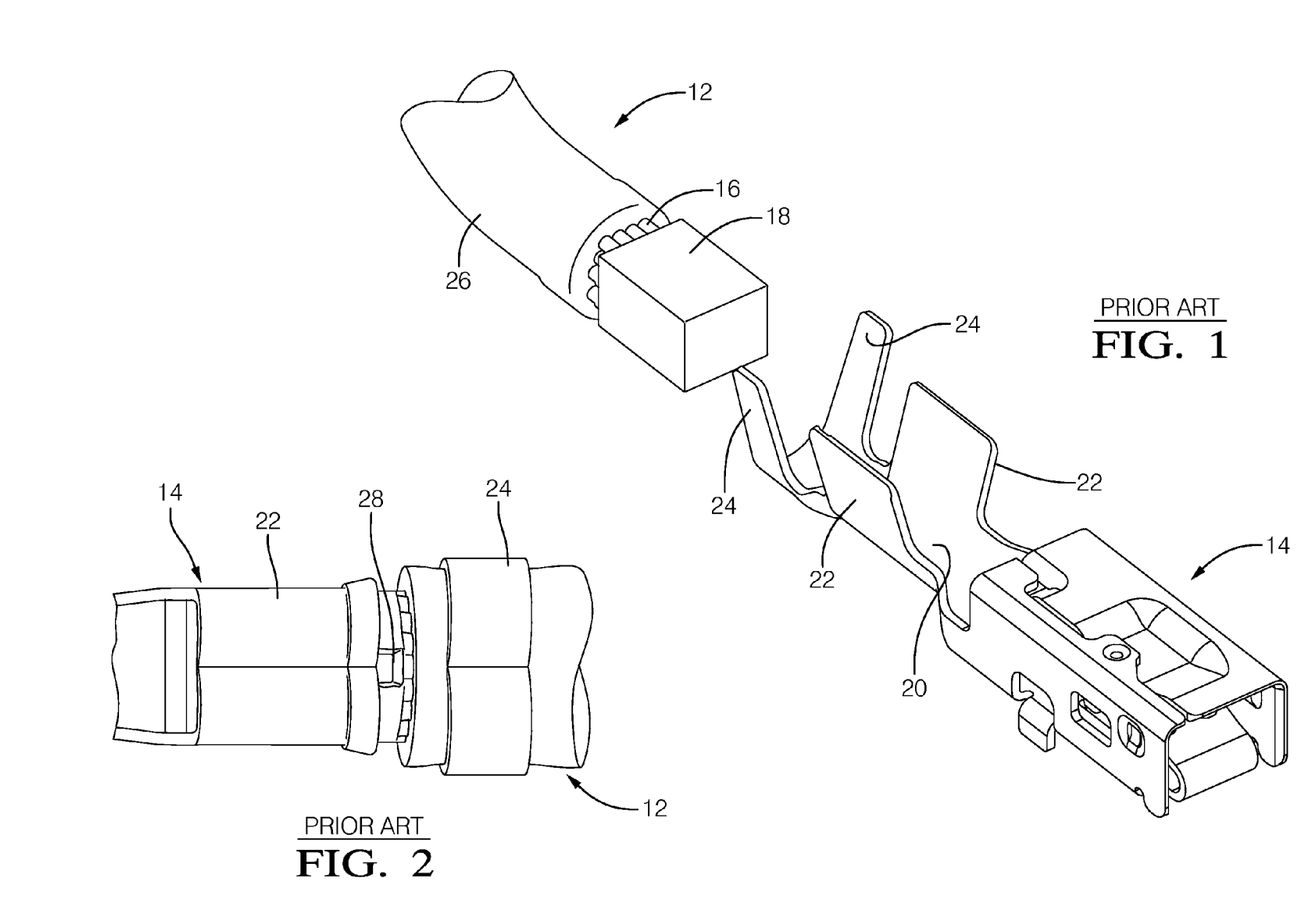
FIG. 1 is a perspective exploded view of a wire cable terminal and a wire cable having individual stands of an end of the wire cable joined together to form a rectangular cuboid shape as found in the prior art.
FIG. 2 is a perspective view of the wire cable terminal and wire cable illustrating a void in the rectangular cuboid shape as found in the prior art.

FIG. 1 illustrates a wire cable 12 attached to a wire cable terminal 14 according to the prior art. The uninsulated individual stands 16 of an end of the wire cable 12 are joined together to form a solid shape 18 that generally defines a rectangular cuboid or rectangular prism. The formed shape 18 of the end of wire cable 12 is hereafter referred to as a "nugget" 18. The nugget 18 may be formed by ultrasonically welding the wire strands 16 together. This is especially beneficial when aluminum wire cables are used because the ultrasonic welding breaks down surface oxides on the wire strands 16 of the aluminum cable, improving strand-to-strand conductivity. The wire cable 12 is then attached to the terminal 14 by placing the nugget 18 into the base portion 20 of the terminal 14 and crimping the wire crimping wings 22 over the nugget 18 and the insulation crimping wings 24 to the wire cable insulation 26. A liquid sealant (not shown) may be applied to the nugget 18 prior to attaching the terminal 14 to seal the surface of the nugget 18 and penetrate inter-strand voids to inhibit galvanic corrosion that may occur if the wire cable 12 and the terminal 14 are formed of dissimilar metals, such as an aluminum wire cable and a copper-based terminal.

As illustrated in FIG. 2, the nugget 18 formed by the prior art method may fracture due to stress induced by the wire crimping wings 22 after the wire crimping wings 22 are crimped to the nugget 18. The fracture may form a void 28 in the nugget 18 that is unprotected by the applied sealant. This void 28 may present a site that is subject to galvanic corrosion.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a method of attaching a wire cable terminal to a multi-strand wire cable is provided. The method includes the steps of providing the multi-strand wire cable and the terminal having a pair of crimping wings, forming an uninsulated end of the wire cable into a shape generally defining a rectangular cuboid having one face that defines a longitudinal concavity, and crimping the terminal to the shaped end of the wire cable such that free ends of the pair of crimping wings are disposed within the longitudinal concavity. The longitudinal concavity may be characterized as a generally triangular concavity or a generally arcuate concavity. The method may further include the step of applying a sealant to the shaped end of the wire cable prior to the step of crimping the terminal to the shaped end. The uninsulated end of the wire cable may be formed by applying ultrasonic mechanical vibrational energy to the end of the wire cable.

In another embodiment of the present invention, a multi-strand wire cable configured to be attached to a wire cable terminal is provided. The multi-strand wire cable has an uninsulated end of the wire cable formed into a shape generally defining a rectangular cuboid having one face that defines a longitudinal concavity. The longitudinal concavity may be characterized as a generally triangular concavity or a generally arcuate concavity.

In yet another embodiment of the present invention, an ultrasonic welding apparatus configured to form an uninsulated end of a wire cable into a shape generally defining a rectangular cuboid having one face that defines a longitudinal concavity is provided. The ultrasonic welding apparatus includes an ultrasonic horn, an anvil defining a longitudinal convexity configured to produce the longitudinal concavity, and a chamber configured to receive the end of the wire cable. The chamber is disposed between the ultrasonic horn and the anvil. The longitudinal convexity may be generally characterized as an angular convexity or as a rounded convexity.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

A method of attaching a wire cable to a wire cable terminal is presented herein. The wire cable is formed of multiple strands of a conductive material, such as aluminum, in order to provide a more flexible wire cable and is covered by an insulative dielectric material. As used herein, aluminum may refer to pure aluminum or an aluminum-containing alloy. The design, materials, and fabrication of multi-strand insulated wire cables are well known to those skilled in the art. The wire cable terminal includes a mating end that is configured to attach to a corresponding mating terminal and a wire attachment end that includes a base portion that received the uninsulated end of the wire cable and a pair of wire crimp wings protruding from the base that are folded over the wire end to mechanically and electrically attach the terminal to the wire cable. The terminal also includes a pair of insulation crimp wings that mechanically attach the terminal to the insulation of the wire cable. The design, materials, and fabrication of terminals configured to be crimped to wire cables are well known to those skilled in the art.

Figure 3:
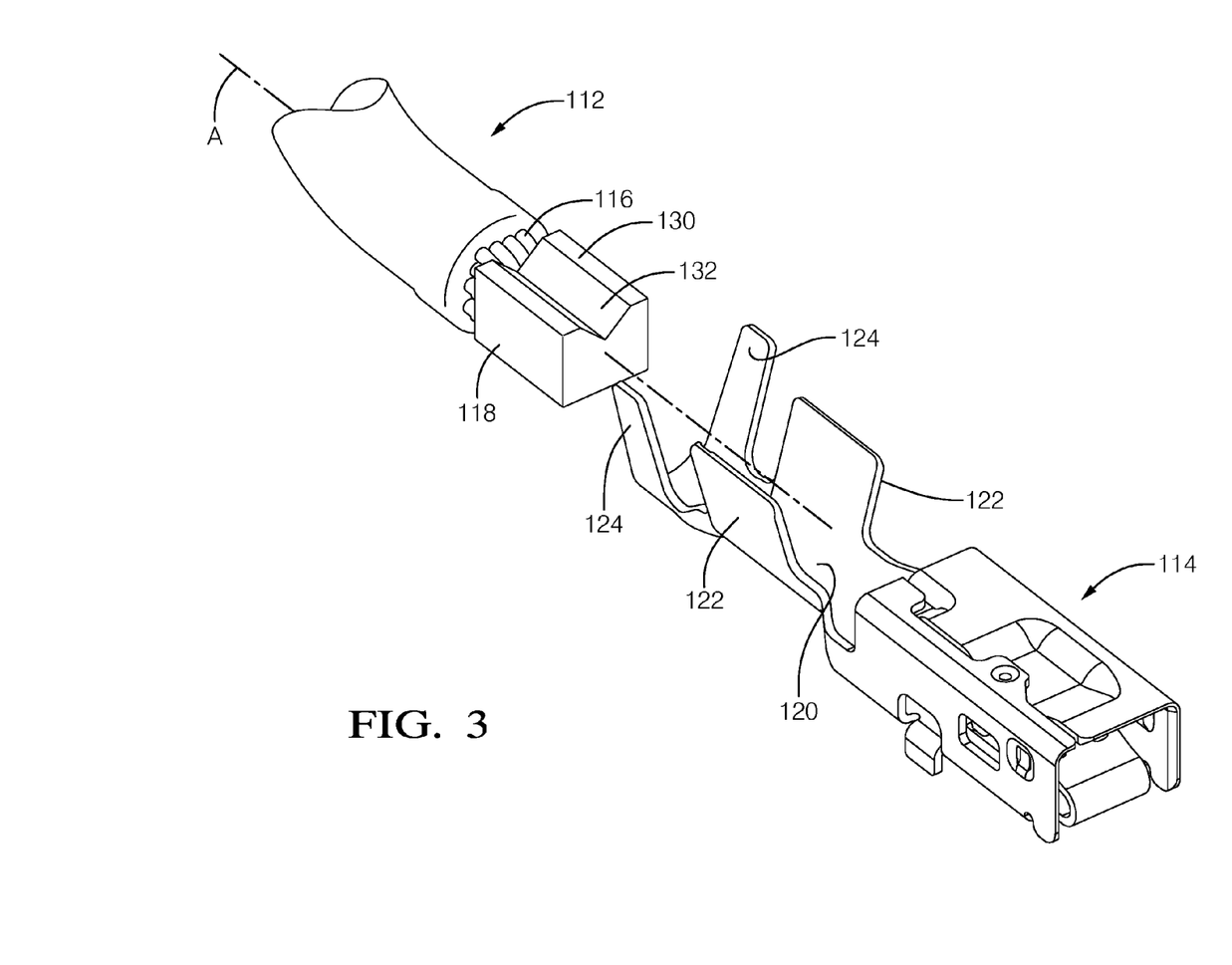
FIG. 3 is a perspective exploded view of a wire cable terminal and a wire cable having individual stands of the wire cable joined together to form a rectangular cuboid shape having one face that defines a longitudinal concavity in accordance with one embodiment.

FIG. 3 illustrates a non-limiting example embodiment 100 wherein a wire cable 112 is configured to be attached to a wire cable terminal 114. In this embodiment, uninsulated ends of the wire strands 116 are formed into a nugget 118 having a generally solid shape that generally defines a rectangular cuboid or rectangular prism. As used herein, the generally solid shape may still retain some inter-strand voids. The nugget 118 includes one face 130 that defines a longitudinal concavity 132, which may be otherwise referred to as an indentation or channel, which is oriented generally parallel to the longitudinal axis A of the wire cable 112. As used herein, generally parallel means ±15° of absolutely parallel. The nugget 118 may be formed by ultrasonically welding the wire strands 116 together. It has been observed that a nugget 118 having a longitudinal concavity 132 is less prone to fracture than the nugget 118 formed according to the prior art as illustrated in FIG. 1.

Figure 4A:
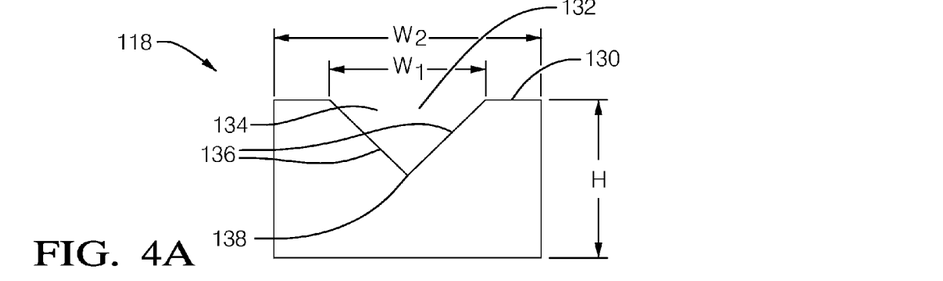
FIG. 4A is cross section view of the joined end of the wire cable of FIG. 3 having an angular longitudinal concavity in accordance with one embodiment.

According to one non-limiting example illustrated in FIG. 4A, the longitudinal concavity 132 is generally characterized as an angular concavity 134; in this example the angular concavity 134 has a generally triangular concave cross section. As used herein, generally triangular concave cross section means that the concavity defines two opposed planar surfaces 136 meeting at an interior vertex 138 and that the vertices of the triangle may be rounded.

Figure 4B:
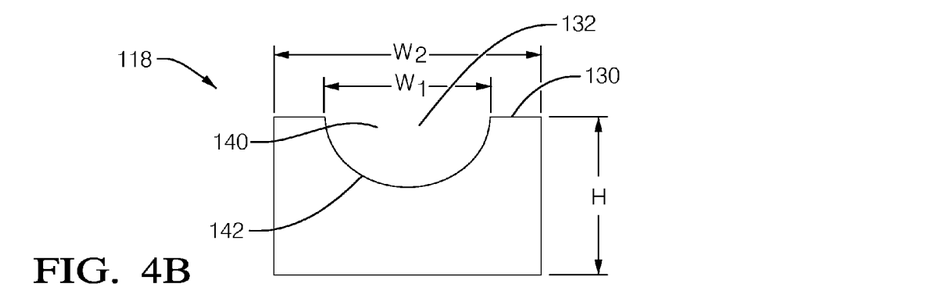
FIG. 4B is cross section view of the joined end of the wire cable of FIG. 3 having a rounded longitudinal concavity in accordance with one embodiment.

According to another non-limiting example illustrated in FIG. 4B, the longitudinal concavity 132 is generally characterized as a rounded concavity 140; in this example the rounded concavity 140 has a generally arcuate concave cross section 142. As used herein, generally arcuate concave cross section 142 means that the interior surfaces of the concavity are at a generally constant radius, i.e. ±0.5 mm, from an axis generally parallel to the longitudinal axis of the nugget 118 and that the degrees of arc of the arcuate concave cross section 142 is between 60 and 180 degrees.

As illustrated in FIGS. 4A and 4B, the cross sectional width $W_1$ of the longitudinal concavity 132 is less than the cross sectional width $W_2$ of the one face 130 of the nugget 118 defining the longitudinal concavity 132. Preferably, the width $W_1$ is 33% to 67% of the width $W_2$ or as alternatively stated, the ratio of the width $W_1$ to the width $W_2$ is in the range of 1:3 to 2:3. The width $W_2$ is preferably greater than the cross sectional height H of the nugget 118.

Although the illustrated embodiments include a nugget having a rectangular cuboid shape and a longitudinal concavity with an angular or rounded cross section, Alternative embodiments may easily be envisioned. For example, the nugget may alternatively have a generally hexagonal cuboid, octagonal cuboid, or cylindrical shape and the nugget may define a longitudinal concavity having a generally square, rectangular, or trapezoidal cross section.

Figure 7:
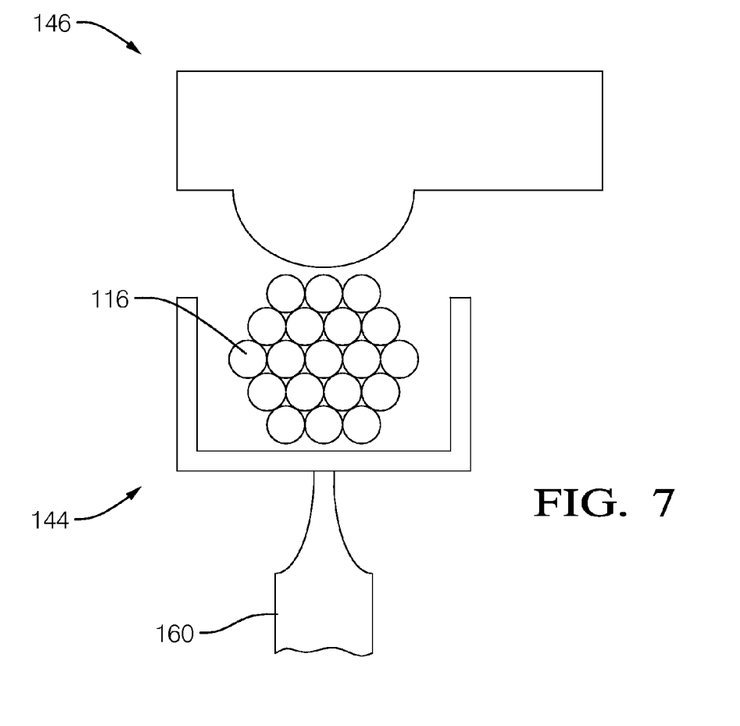
FIG. 7 is a cross sectional view of an apparatus configured to form the joined end of the wire cable of FIG. 3 including the anvil of FIG. 6B in accordance with one embodiment.

The nugget 118 may be formed by securing the uninsulated end of the wire strands 116 in a chamber 144 of an ultrasonic welding apparatus configured to receive the end of the wire cable 112. The chamber 144 has at least two open sides, one to allow entrance of the wire cable 112 and the other to allow entrance of a fixed work surface 146, hereinafter referred to as an anvil 146. The anvil 146 is a generally planar plate having a longitudinal convexity 148 or ridge protruding from the planar surface.

Figure 6A:
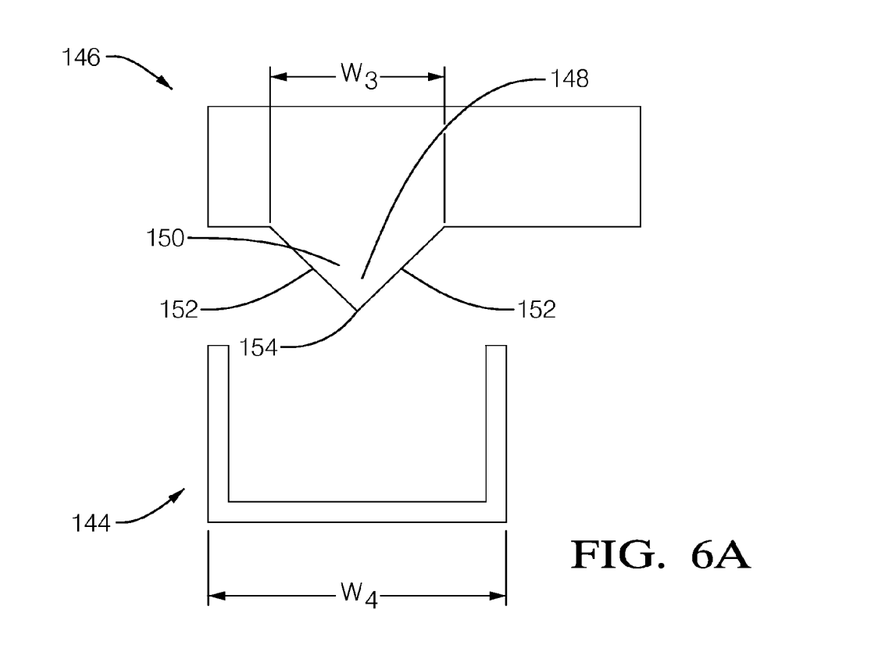
FIG. 6A is cross section view of an anvil having an angular longitudinal convexity in accordance with one embodiment.

According to one non-limiting example illustrated in FIG. 6A, the longitudinal convexity 148 is generally characterized as an angular convexity 150; in this example the angular convexity 150 has a generally triangular convex cross section. As used herein, generally triangular convex cross section means that the longitudinal convexity 148 defines two opposed planar surfaces 152 meeting at an exterior vertex 154 and that the vertices of the triangle may be rounded.

Figure 6B:
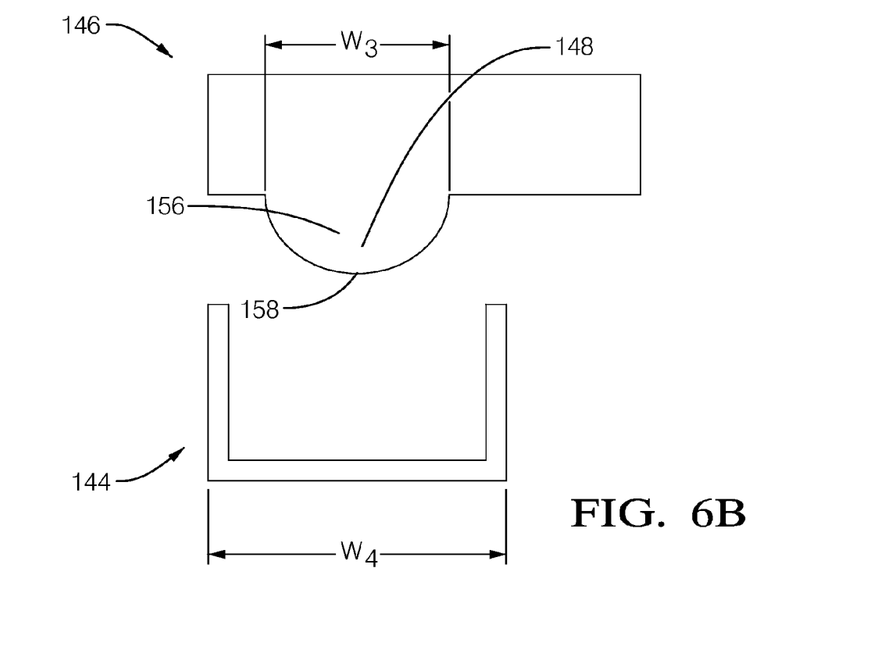
FIG. 6B is cross section view of an anvil having a rounded longitudinal convexity in accordance with one embodiment.

According to another non-limiting example illustrated in FIG. 6B, the longitudinal convexity 148 is generally characterized as a rounded convexity 156; in this example the rounded convexity 156 has a generally arcuate convex cross section 158. As used herein, generally arcuate convex cross section 158 means that the exterior surfaces of the longitudinal convexity 148 are at a generally constant radius, i.e. ±0.5 mm, from an axis generally parallel to the longitudinal axis of the anvil 146 and that the degrees of arc of the arcuate convex cross section 158 is between 60 and 180 degrees.

As illustrated in FIGS. 6A and 6B, the cross sectional width $W_3$ of the longitudinal convexity 148 is less than the cross sectional width $W_4$ of the chamber 144. Preferably, the width $W_3$ is 33% to 67% of the width $W_4$ or as alternatively stated the ratio of the width $W_3$ to the width $W_4$ is in the range of 1:3 to 2:3.

Figure 8:
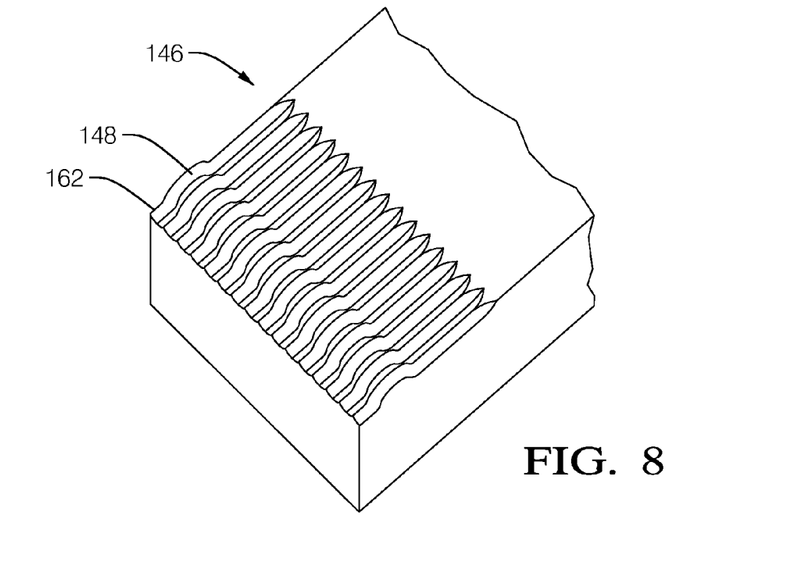
FIG. 8 is a perspective view of the anvil of FIG. 6B in accordance with one embodiment.

As illustrated in FIG. 7, the wire strands 116 are placed into the chamber 144 and the wire strands 116 are trapped between the walls of the chamber 144 and the anvil 146 as the anvil 146 is inserted into the chamber 144. An ultrasonic horn 160 is brought into mechanical contact with the chamber 144 and the ultrasonic horn 160 and the ultrasonic horn 160 applies ultrasonic vibrational energy to the chamber 144 which is transmitted to the wire cable 112, causing the wire cable 112 to vibrate against the fixed anvil 146 ultrasonically welding the wire strands 116 of the wire cable 112 into the nugget 118. As used herein, the frequency of the ultrasonic vibrational energy is greater than 15 kilohertz (kHz) and preferably in the range of 15 to 40 kHz. The longitudinal convexity 148 of the anvil 146 forms a corresponding longitudinal concavity 132 in the nugget 118. Alternatively, the ultrasonic horn 160 may be applied to the anvil 146 and the chamber 144 may be fixed. As shown in FIG. 8, the anvil 146 may define lateral ridges 162 that enhance the transfer of ultrasonic vibrational energy to the wire cable 112. The chamber 144 may also define similar lateral ridges.

Figure 5:
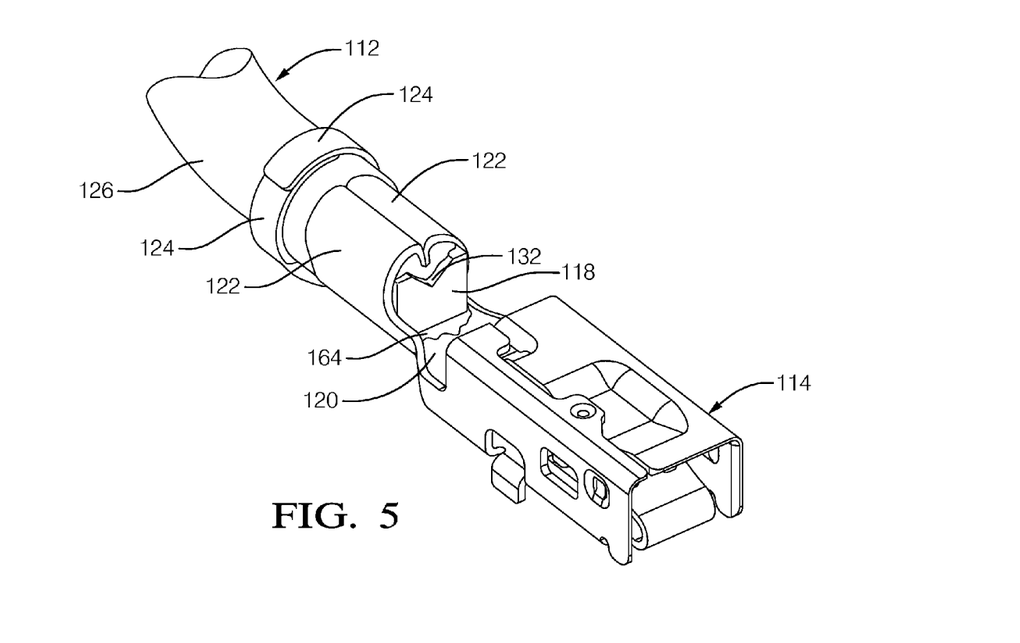
FIG. 5 is a perspective view of the wire cable terminal and the wire cable of FIG. 3 in accordance with one embodiment.

As illustrated in FIG. 5, the wire cable 112 is attached to the terminal 114 by placing the nugget 118 into the base portion 120 of the terminal 114 and crimping the wire crimping wings 122 over the nugget 118 and the insulation crimping wings 124 to the wire cable insulation 126. The free ends of wire crimping wings 122 are disposed within the longitudinal concavity 132 after the terminal 114 is crimped to the wire cable 112. When the wire crimping wings 122 are secured to the nugget 118, the nugget 118 may be squeezed up to 40% beyond compaction, causing a portion of the nugget 118 to extrude from the wire crimping wings 122. A liquid sealant 164 may be applied to the nugget 118 prior to attaching the terminal 114 to inhibit galvanic corrosion. The sealant may collect or pool within the longitudinal concavity 132 and provide a reservoir of sealant that may seal a fracture in the nugget 118 that occurs due to crimping.

While the nugget having a longitudinal concavity in the aforementioned embodiments is formed by ultrasonic welding, other embodiments may be envisioned wherein a nugget having a longitudinal concavity is formed by resistance welding, compacting, or extruding the wire strands of the wire cable. Alternatively, the longitudinal concavity may be formed in the rectangular cuboid nugget by a machining or grinding process.

Figure 9:
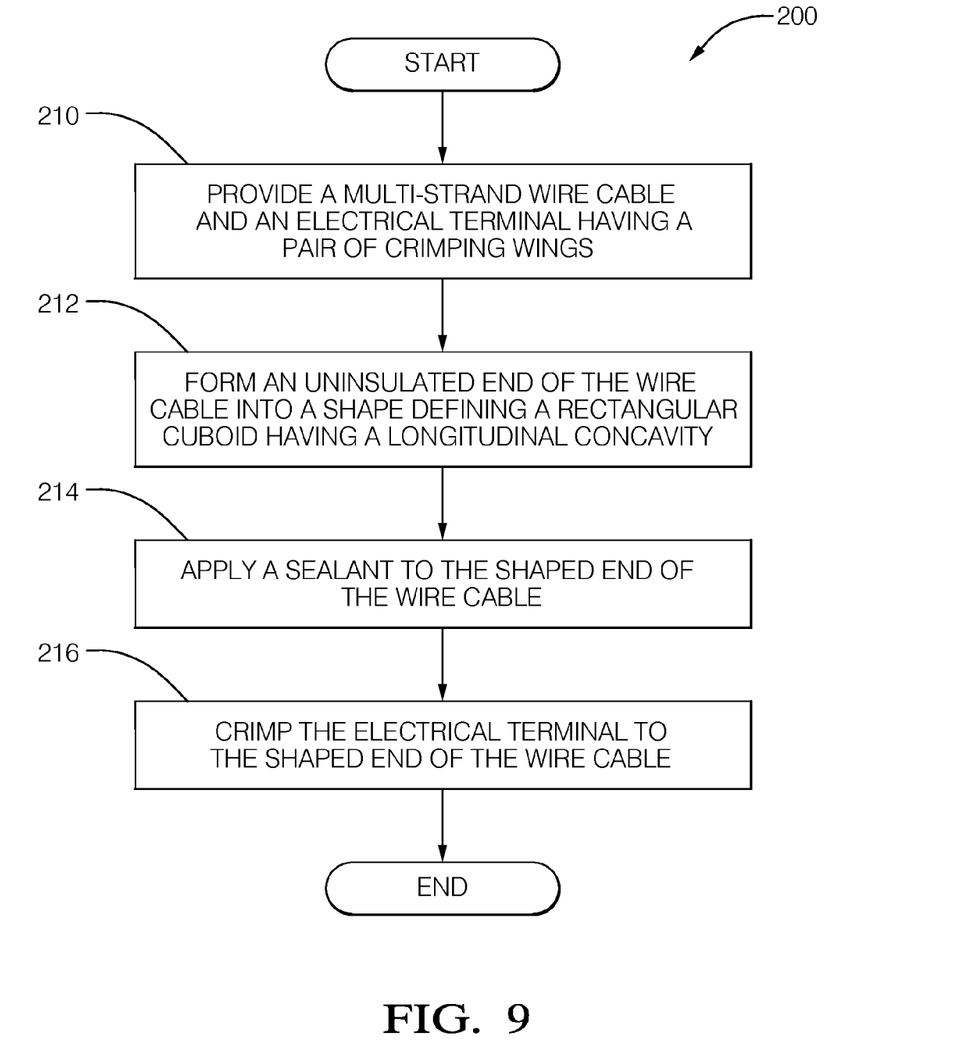
FIG. 9 is a flow chart of a method of attaching a wire cable terminal to a multi-strand wire cable in accordance with one embodiment.

FIG. 9 illustrates a method 200 of a method of attaching a wire cable terminal 114 to a multi-strand wire cable 112.

In step 210, PROVIDE A MULTI-STRAND WIRE CABLE AND AN ELECTRICAL TERMINAL HAVING A PAIR OF CRIMPING WINGS, a wire cable 112 and a wire cable terminal 114 having a pair of wire crimping wings 122 is provided. The wire cable 112 may be formed of an aluminum material.

In step 212, FORM AN UNINSULATED END OF THE WIRE CABLE INTO A SHAPE DEFINING A RECTANGULAR CUBOID HAVING A LONGITUDINAL CONCAVITY, an uninsulated end of the wire strands 116 are formed into a nugget 118 having a shape generally defining a rectangular cuboid having one face 130 that defines a longitudinal concavity 132. Ultrasonic mechanical vibrational energy may be applied to the wire strands 116 to form the wire cable 112 into the nugget shape. The longitudinal concavity 132 may be generally characterized as an angular concavity 134 and the angular concavity 134 may be characterized as a generally triangular concavity. Alternatively, the longitudinal concavity 132 may be generally characterized as a rounded concavity 140 and the rounded concavity 140 may be characterized as a generally arcuate concavity. A maximum width of the longitudinal concavity 132 is preferably between 33% and 67% of a width of the one face 130 or as alternatively stated, the ratio of the width of the longitudinal concavity 132 to the width of the one face 130 is in the range of 1:3 to 2:3.

In optional step 214, APPLY A SEALANT TO THE SHAPED END OF THE WIRE CABLE, a sealant may be applied to the shaped end of the wire cable 112. Step 214 may be performed prior to step 216.

In step 216, CRIMP THE ELECTRICAL TERMINAL TO THE SHAPED END OF THE WIRE CABLE, The wire cable terminal 114 is crimped to the shaped end, or nugget 118, of the wire cable 112 such that free ends of the pair of wire crimping wings 122 are disposed within the longitudinal concavity 132.

Accordingly, a multi-strand wire cable 112 having an uninsulated end of the wire strands 116 formed into a shape generally defining a rectangular cuboid nugget 118 having one face 130 that defines a longitudinal concavity 132 that is configured to be attached to a wire cable terminal 114, an ultrasonic welding apparatus configured to form the wire strands 116 of a wire cable 112 into a shape generally defining a rectangular cuboid nugget 118 having one face 130 that defines a longitudinal concavity 132, and a method 200 of attaching a wire cable terminal 114 to a wire cable 112 is provided. The nugget 118 reduces inter-stand resistance while the longitudinal concavity 132 reduces the occurrence of fracturing when the terminal 114 is attached to the wire cable 112 by crimping the wire crimping wings 122 of the terminal 114 to the nugget 118. The longitudinal concavity 132 may also contain a reservoir of sealant when a liquid sealant 164 is applied to the nugget 118 prior to crimping to the terminal 114. The sealant in the longitudinal concavity 132 may seal any voids that are created by fractures when the terminal 114 is crimped to the nugget 118.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A method of attaching a wire cable terminal to a multi-strand wire cable, comprising the steps of:
    providing said multi-strand wire cable and said wire cable terminal having a pair of crimping wings;
    forming an uninsulated end of said wire cable into a shape generally defining a rectangular cuboid having one face that defines a longitudinal concavity;
    applying a liquid sealant to the shaped end of the wire cable;
    providing a reservoir of liquid sealant within the longitudinal concavity; and
    crimping said wire cable terminal to said shaped end of the wire cable such that free ends of said pair of crimping wings are disposed within said longitudinal concavity, wherein the liquid sealant within the reservoir of liquid sealant is capable of flowing and sealing voids in the shaped end of the wire cable created during said crimping step.

2. The method in accordance with claim 1, wherein the step of forming the uninsulated end of said wire cable further comprises the step of applying ultrasonic mechanical vibrational energy to the end of the wire cable.

3. The method in accordance with claim 1, wherein the longitudinal concavity is generally characterized as an angular concavity.

4. The method in accordance with claim 3, wherein the angular concavity is characterized as a generally triangular concavity.

5. The method in accordance with claim 1, wherein the longitudinal concavity is generally characterized as a rounded concavity.

6. The method in accordance with claim 5, wherein the rounded concavity is characterized as a generally arcuate concavity.

7. The method in accordance with claim 1, wherein the wire cable is formed of an aluminum material.

8. The method in accordance with claim 1, wherein a maximum width of the longitudinal concavity is between 33% and 67% of a width of the one face.

9. The method in accordance with claim 1, wherein the shaped end of the wire cable is squeezed 20% to 40% beyond compaction during the crimping step.

10. The method in accordance with claim 1, wherein the wire cable is formed of aluminum and the wire cable terminal is formed of copper-based material.

11. A method of attaching a wire cable terminal to a multi-strand wire cable, comprising the steps of:
    providing said multi-strand wire cable and said wire cable terminal having a pair of crimping wings;
    forming an uninsulated end of said wire cable into a shape generally defining a rectangular cuboid having one face that defines a longitudinal concavity;
    applying a liquid sealant to the shaped end of the wire cable;
    providing a reservoir of liquid sealant within the longitudinal concavity; and
    crimping said wire cable terminal to said shaped end of the wire cable such that free ends of said pair of crimping wings are disposed within said longitudinal concavity, wherein the liquid sealant within the reservoir of liquid sealant is capable of flowing and sealing fractures in the shaped end of the wire cable created during said crimping step.

12. A method of attaching a wire cable terminal to a multi-strand wire cable, comprising the steps of:
    providing said multi-strand wire cable and said wire cable terminal having a pair of crimping wings;
    forming an uninsulated end of said wire cable into a shape generally defining a rectangular cuboid having one face that defines a longitudinal concavity;
    dispensing an amount of liquid sealant within the longitudinal cavity sufficient to provide a reservoir of liquid sealant within the longitudinal concavity; and
    crimping said wire cable terminal to said shaped end of the wire cable such that free ends of said pair of crimping wings are disposed within said longitudinal concavity, wherein the liquid sealant within the reservoir of liquid sealant is capable of flowing and sealing fractures in the shaped end of the wire cable created during said crimping step.

* * * * *